UNITED STATES PATENT OFFICE 1,965,502

MAKING OPTICALLY ACTIVE PHENYL-ALCAMINES

Helmut Legerlotz, Berlin-Friedenau, Germany

No Drawing. Application June 8, 1933, Serial No. 674,962. In Germany June 11, 1932

6 Claims. (Cl. 260—128.5)

This invention relates to the manufacture of optically active phenylalcamines and has for its main object to change the direction of rotation of optically active phenylalcamines.

A further object of the invention is to provide for a simple and effective method to convert d- or l-phenylalcamines into l- or d-phenylalcamines.

Still a further object of the invention is to provide for a simple and effective method to convert d-hydroxyphenylmethylaminoethanols into the more valuable l-hydroxy-phenylmethylaminoethanols.

It is known to convert optically active phenylalcamines of the formula

in which $R_1$ is the phenyl or monohydroxyphenyl group, $R_2$ hydrogen or an alkyl group and $R_3$ hydrogen or an alkyl group, such as adrenaline or hydroxyphenylethanol-N-methylamine, into the racemic compound by treatment with acids. It is further known to convert this racemic compound into the optically active compound showing the opposite direction of rotation. This method is used in the art to make more valuable compounds, especially laevorotatory compounds from less valuable compounds, especially dextrorotatory compounds. This method is however not simple and generally bound to substantial losses of the starting material, which take place during the racemization and the splitting up of the racemized body. The racemization of for example d-adrenaline leads to losses of about 8–10% of the starting material.

According to the invention the racemization of optically active compounds for the manufacture of oppositely rotatory compounds may be avoided and laevorotatory phenylalcamines may be directly prepared from dextrorotatory phenylalcamines by acylating the starting material and saponifying the acylation product obtained. This new method is of especial importance in those cases where the racemization of the starting material makes considerable difficulties, which is the case with the optically active hydroxyphenylmethylaminoethanols. The acylation and the saponification in the new method is carried out by the usual methods.

Examples 1. 100 g. of d-m-hydroxyphenylmethylaminoethanol with a rotatory power of +54° are dissolved while heating in 500 g. of acetic acid anhydride. The solution obtained is mixed with a solution of 60 g. of concentrated sulfuric acid in 200 g. of acetic acid anhydride and the mixture boiled for some hours under reflux. The acetic acid anhydride is separated from the reaction mixture by distillation under reduced pressure; the residue obtained is taken up with diluted sulfuric acid and boiled for about one hour under reflux. After cooling the free base is separated in the usual manner, thus obtaining about 85 g. of l-m-hydroxyphenylmethylaminoethanol melting at 171° C. and having a specific rotatory power of —53,5°.

2. 16,7 g. of d-o-hydroxyphenylmethylaminoethanol are dissolved in 50 g. of glacial acetic acid and 14,5 g. of benzoyl chloride are added to the solution. The mixture is boiled under reflux for some hours and the glacial acetic acid then distilled off under reduced pressure. The residue is saponified by boiling with a 5% aqueous solution of hydrochloric acid. When working up in the usual manner the reaction mixture obtained by saponification, 14,5 g. of l-o-hydroxyphenylmethylaminoethanol are obtained, the hydrochloride of which has a specific rotatory power of —38°.

3. 1000 g. of d-$\psi$-ephedrine base are dissolved in 3500 ccm. of acetic acid anhydride and a mixture of 1750 ccm. of acetic acid anhydride with 300 ccm. of concentrated sulfuric acid is added to the solution. The precipitated sulfate is dissolved by heating the reaction mixture on the water bath and the solution is then boiled under reflux for about 3 to 4 hours.

The excess of acetic acid anhydride is distilled off at reduced pressure and to the distillation residue obtained are added 4000 ccm. of water and 75 ccm. of concentrated sulfuric acid. The mixture is then boiled for about one hour and the solution obtained is treated while cooling with an excess of sodium hydroxide solution. The precipitated bases are taken up with ether and the ethereal solution is evaporated. The bases are then separated in the usual manner by the oxalate method. 650 g. of l-ephedrine are obtained, whereas the unconverted d-$\psi$-ephedrine is recovered nearly quantitatively.

The foregoing detailed examples have been given for clearness of understanding only, and no unnecessary limitations should be understood therefrom, but the appended claims should be construed as broadly as permissible in view of the prior art.

I claim:

1. A method for making l-phenylalcamines which consists in acylating d-phenylalcamines of the formula

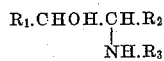

in which $R_1$ is the phenyl or the monohydroxyphenyl group, $R_2$ is hydrogen or an alkyl group and $R_3$ is an alkyl group, and saponifying the product of acylation obtained.

2. A method for making l-hydroxyphenylmethylaminoethanol which consists in acylating d-hydroxyphenylmethylaminoethanol and saponifying the product of acylation obtained.

3. A method for making l-m-hydroxyphenylmethylaminoethanol which consists in acylating d-m-hydroxyphenylmethylaminoethanol and saponifying the product of acylation obtained.

4. A method for making l-o-hydroxyphenylmethylaminoethanol which consists in acylating d-o-hydroxyphenylmethylaminoethanol and saponifying the product of acylation obtained.

5. A method for making l-m-hydroxyphenylmethylaminoethanol which consists in acetylating d-m-hydroxyphenylmethylaminoethanol and saponifying the product of acetylation obtained.

6. A method for making l-o-hydroxyphenylmethylaminoethanol which consists in acetylating d-o-hydroxyphenylmethylaminoethanol and saponifying the product of acetylation obtained.

HELMUT LEGERLOTZ.